United States Patent
Koga et al.

(10) Patent No.: US 9,895,835 B2
(45) Date of Patent: Feb. 20, 2018

(54) MOLDING APPARATUS

(71) Applicant: NOK CORPORATION, Tokyo (JP)

(72) Inventors: Shotaro Koga, Fujisawa (JP); Tetsuya Urakawa, Fujisawa (JP); Takeshi Masaka, Fujisawa (JP); Yoshihiro Kurano, Fujisawa (JP); Shigeru Watanabe, Fujisawa (JP); Toshihiro Shimazoe, Fujisawa (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/777,632

(22) PCT Filed: Mar. 20, 2014

(86) PCT No.: PCT/JP2014/057654
§ 371 (c)(1),
(2) Date: Sep. 16, 2015

(87) PCT Pub. No.: WO2014/156917
PCT Pub. Date: Oct. 2, 2014

(65) Prior Publication Data
US 2016/0288390 A1    Oct. 6, 2016

(30) Foreign Application Priority Data
Mar. 26, 2013    (JP) .................. 2013-063786

(51) Int. Cl.
*B29C 45/27*    (2006.01)
*B29C 45/14*    (2006.01)
(Continued)

(52) U.S. Cl.
CPC .......... *B29C 45/2756* (2013.01); *B29C 33/34* (2013.01); *B29C 33/38* (2013.01);
(Continued)

(58) Field of Classification Search
CPC ............... B29C 45/2756; B29C 33/34; B29C 2045/0027; B29C 45/0416; B29C 45/1759; B29C 45/32; B29C 33/36
See application file for complete search history.

(56) References Cited

U.S. PATENT DOCUMENTS 3,981,661 A    9/1976    Taylor
4,890,725 A *  1/1990    Fierkens .............. B23Q 7/1426
                                                        198/774.1
(Continued)

FOREIGN PATENT DOCUMENTS

CN    1620365 A    5/2005
CN    101279497 A    10/2008
(Continued)

OTHER PUBLICATIONS

Extended European Search Report for Application No. EP 14 77 5138 dated Apr. 20, 2016 (9 pages).
(Continued)

*Primary Examiner* — Ryan Ochylski
(74) *Attorney, Agent, or Firm* — Harness, Dickey & Pierce, P.L.C.

(57) ABSTRACT

In order to achieve lower costs in a molding apparatus using a mold by reducing mold cleaning steps following releasing of the product from the mold and shortening the molding cycle, the apparatus is equipped with a plurality of fixed molds and movable molds which are heated to the temperature necessary to harden a molding material and come together by means of clamping to form a cavity, and a non-heated cold runner which supplies the molding material from an injection device to the interior of the cavity via a gate opened in the movable mold, the fixed molds and movable molds being movable between an injection stage
(Continued)

where the injection device and cold runner (32) are present and an opening stage near the injection stage.

2 Claims, 7 Drawing Sheets

(51) Int. Cl.
| | |
|---|---|
| *B29C 45/17* | (2006.01) |
| *B29C 45/28* | (2006.01) |
| *B29C 33/34* | (2006.01) |
| *B29C 45/04* | (2006.01) |
| *H01M 8/0284* | (2016.01) |
| *H01M 8/0286* | (2016.01) |
| *B29C 33/38* | (2006.01) |
| *B29C 45/00* | (2006.01) |
| *B29C 45/32* | (2006.01) |
| *B29C 45/64* | (2006.01) |
| *B29L 31/26* | (2006.01) |
| *B29C 45/06* | (2006.01) |
| *B29L 31/34* | (2006.01) |
| *H01M 8/0273* | (2016.01) |
| *B29K 21/00* | (2006.01) |

(52) U.S. Cl.
CPC ...... *B29C 45/0001* (2013.01); *B29C 45/0025* (2013.01); *B29C 45/0416* (2013.01); *B29C 45/14336* (2013.01); *B29C 45/1759* (2013.01); *B29C 45/28* (2013.01); *B29C 45/32* (2013.01); *B29C 45/64* (2013.01); *H01M 8/0284* (2013.01); *H01M 8/0286* (2013.01); *B29C 45/06* (2013.01); *B29C 2045/067* (2013.01); *B29K 2021/00* (2013.01); *B29K 2905/00* (2013.01); *B29L 2031/265* (2013.01); *B29L 2031/3468* (2013.01); *H01M 8/0273* (2013.01)

(56) References Cited

U.S. PATENT DOCUMENTS

| | | |
|---|---|---|
| 6,106,758 A | 8/2000 | Douche et al. |
| 6,302,681 B1 | 10/2001 | Douche et al. |

FOREIGN PATENT DOCUMENTS

| | | |
|---|---|---|
| CN | 102185047 A | 9/2011 |
| CN | 102361741 A | 2/2012 |
| CN | 202685192 U | 1/2013 |
| EP | 0407797 A1 | 1/1991 |
| EP | 1595676 A1 | 11/2005 |
| EP | 2415582 A1 | 2/2012 |
| JP | S52-977 B1 | 1/1977 |
| JP | S60-045642 A | 3/1985 |
| JP | S61-5909 A | 1/1986 |
| JP | S61-029515 A | 2/1986 |
| JP | S61-43019 U | 3/1986 |
| JP | H02-165992 A | 6/1990 |
| JP | H05-200778 A | 8/1993 |
| JP | H06-106557 A | 4/1994 |
| JP | H11-34126 A | 2/1999 |
| JP | H11-254486 A | 9/1999 |
| JP | 2002-273769 A | 9/2002 |
| JP | 2004-345328 A | 12/2004 |
| JP | 2005-081677 A | 3/2005 |
| JP | 2007-112027 A | 5/2007 |
| JP | 2007-152627 A | 6/2007 |
| JP | 2007-216622 A | 8/2007 |

OTHER PUBLICATIONS

G. Menges et al., "Cold Runners In: How to Make Injection Molds", Jan. 1, 2001, Carl Hanser Verlag, Munchen, XP055263980, ISBN: 978-3-446-21256-5, pp. 242-247.

Jin Zhiming, Plastic Injection Molding Practical Technology, published by Printing Industry Press of Beijing, China on May 31, 2009, pp. 63-64, and translation (9 pages).

Brinkmann, Osswald Baur and Oberbach Schmachtenberg: "International Plastics Handbook—The Resource for Plastics Engineers", Fourth Edition; Chemical Industry Press, Beijing (2006).

Japanese Office Action for Application No. 2013-063786 dated Apr. 5, 2017 with English translation (5 pages).

* cited by examiner

MOLDING APPARATUS

CROSS-REFERENCE TO RELATED APPLICATIONS

This application is a U.S. National Phase Application under 35 U.S.C. 371 of International Application No. PCT/JP2014/057654, filed on Mar. 20, 2014 and published in Japanese as WO 2014/156917A1 on Oct. 2, 2014. This application claims priority to Japanese Patent Application No. 2013-063786, filed on Mar. 26, 2013. The entire disclosures of the above applications are incorporated herein by reference.

BACKGROUND OF THE INVENTION

Field of the Invention

The present invention relates to a molding apparatus for molding a sealing part, for example, a gasket of a fuel battery cell.

Description of the Conventional Art

In molding of a substrate integrated type gasket, a gasket integrated with a substrate is obtained by setting the substrate in a metal mold, injecting a molding material constructed by a rubber composition into a metal mold cavity, and thermally curing the molding material within the cavity. Particularly, as a method of molding a gasket for a fuel battery cell, there is employed a cold runner type liquid injection molding (LIM) molding apparatus which uses a liquid rubber having a low viscosity as a molding material.

According to this kind of cold runner type LIM molding apparatus, since the liquid rubber is not cured within the cold runner, it is possible to reduce a consumed amount of the material so as to achieve a cost saving. As a typical prior art of the cold runner type LIM molding method, there is a method disclosed in Japanese Unexamined Patent Publication No. 11-34126.

SUMMARY OF THE INVENTION

Problem to be Solved by the Invention

However, according to the conventional cold runner type LIM molding apparatus, after the molding material within the cavity is cured by the heat of the fixed metal mold and the movable metal mold, it is necessary to remove cured material (burr) of the liquid rubber by cleaning a lower surface of the movable metal mold provided with a gate, after opening the mold and taking out a product. As a result, it has been hard to shorten a molding cycle.

The present invention is made by taking the point mentioned above into consideration, and a technical object of the present invention is to achieve a cost saving by reducing a metal mold cleaning step after mold releasing the product so as to achieve shortening of a molding cycle.

Means for Solving the Problem

As a means for effectively solving the technical object mentioned above, a molding apparatus according to the invention of a first aspect is provided with plural sets of fixed metal molds and movable metal molds which are heated to a necessary temperature for curing a molding material and are got together by mold clamping so as to define a cavity, a non-heated cold runner which supplies the molding material from an injection device into the cavity via a gate provided in the movable metal mold, an injection stage in which the injection device and the cold runner exist, and a mold opening stage which is in the vicinity of the injection stage and opens the fixed metal mold and the movable metal mold, wherein the fixed metal molds and the movable metal molds are movable between the injection stage and the mold opening stage.

When molding by the molding apparatus having the structure mentioned above, the fixed metal molds and the movable metal molds are clamped first of all in the injection stage, and the molding material from the injection device is supplied into the cavity defined between the meeting surfaces of the fixed metal molds and the movable metal molds via the cold runner and the gate. Since the cold runner is not heated, the molding material from the injection device is filled into the cavity without being cured by the cold runner.

After the molding material within the cavity is cured by the heat of the fixed metal molds and the movable metal molds, the fixed metal molds and the movable metal molds are moved to the mold opening stage so as to open the mold, and the product is taken out. Further, burr generated by the curing of the molding material by the heat of the movable metal mold is removed within the gate of the movable metal molds is removed. Since the work for taking out the product and removing the burr from the gate after the mold opening is carried out in the mold opening state in place of the injection stage, it is possible to carry out a molding step of clamping the other fixed metal mold and the movable metal mold and supplying the molding material from the injection device so as to cure, in the injection stage.

A molding apparatus according to the invention of a second aspect is the structure described in the first aspect, wherein the cold runner is provided with an inlet valve which can operate so as to open and close from an external portion.

According to the molding apparatus having the structure mentioned above, the uncured material within the cold runner can be prevented from flowing down, by closing the inlet valve when the movable metal mold (the gate) is separated from the cold runner together with the mold opening. Further, the molding material can be supplied into the cavity by opening the inlet valve after the mold clamping.

Effect of the Invention

According to the molding apparatus of the present invention, since the burr from the gate of the movable metal mold is removed in the mold opening stage in the outer side of the injection stage, a cleaning step of the metal mold is not necessary in the injection stage, and it is possible to shorten the molding step.

DETAILED DESCRIPTION OF PREFERRED EMBODIMENT

A description will be in detail given below of a preferable embodiment of a molding apparatus according to the present invention with reference to the accompanying drawings.

Figure 1:
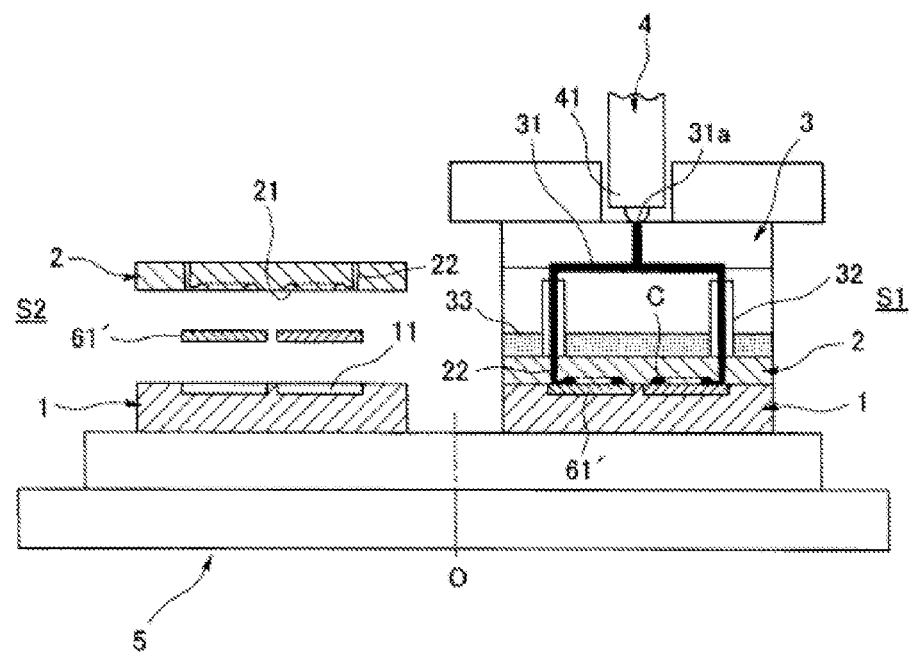
FIG. 1 is an explanatory view showing a preferable embodiment of a molding apparatus according to the present invention.
Figure 9:
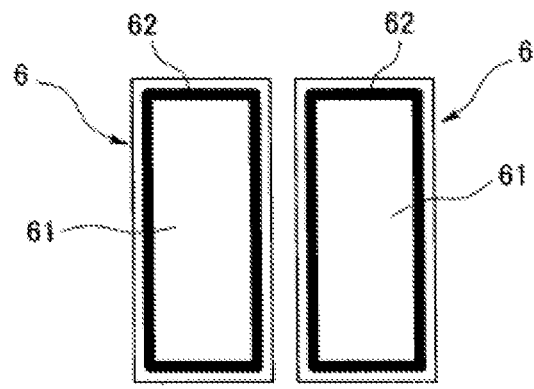
FIG. 9 is a plan view showing a gasket for a fuel battery as a product.

The molding apparatus is a cold runner type liquid injection molding (LIM) apparatus molding a fuel battery cell gasket 6 which is integrally provided with a seal portion 62 made of a rubber-like elastic material (a rubber material or a synthetic resin material having a rubber-like elasticity) in a separator 61 of a fuel battery cell, for example, as shown in FIG. 9, while using a liquid rubber having a viscosity as a molding material. The molding apparatus is provided with a fixed metal mold 1 and a movable metal mold 2 which can be assembled with and separated from an upper surface of the fixed metal mold 1, a cold metal mold member 3 which is arranged so as to be upward and downward movable forward and backward toward the movable metal mold 2 at a predetermined position (an injection stage S1) in a circumferential direction by turning of a turn table 5, and forms a molding material flow path (a cold runner 31) to a cavity C defined by mold clamping of the fixed metal mold 1 and the movable metal mold 2 in its inner portion, an injection device 4 which injects the molding material to the cavity C via the cold runner 31, and a turn table 5 which moves the fixed metal mold 1 and the movable metal mold 2, as shown in FIG. 1.

Further, although an illustration is omitted, the molding apparatus is equipped with a mold clamping device for carrying out a mold opening and mold closing motion of the movable metal mold 2 in relation to the fixed metal mold 1, a drive unit for carrying out an upward and downward moving motion of the cold metal mold member 3 and the injection device 4, a loading device for setting an insert part (a substrate 61' in this embodiment) to the fixed metal mold 1, a product mold releasing device, a burr removing device and a control device controlling these motions.

Describing in detail, the fixed metal mold 1 is fixed on the turn table 5, and is heated to a necessary temperature for crosslinking and curing the liquid rubber, and a plurality of concave portions 11 in which the substrates 61' forming separators 61 of the fuel battery cell gaskets 6 shown in FIG. 9 are formed in an upper surface of the fixed metal mold 1.

The movable metal mold 2 is arranged so as to be movable up and down in relation to the upper surface of the fixed metal mold 1 by the mold clamping device (not shown), and is heated to a necessary temperature for crosslinking and curing the liquid rubber in the same manner as the fixed metal mold 1, and groove-like concave portions 21 defining the cavities C are formed in a lower surface of the movable metal mold 2. The cavity is a shape forming space for molding the seal portion 62 of the fuel battery cell gasket 6 shown in FIG. 9 in relation to the upper surface of the substrate 61' by the mold clamping of the movable metal mold 2 and the fixed metal mold 1. Further, gates 22 which are inlet ports of the liquid rubber to the cavities C are formed in the lower surface of the movable, metal mold 2.

Figure 2:
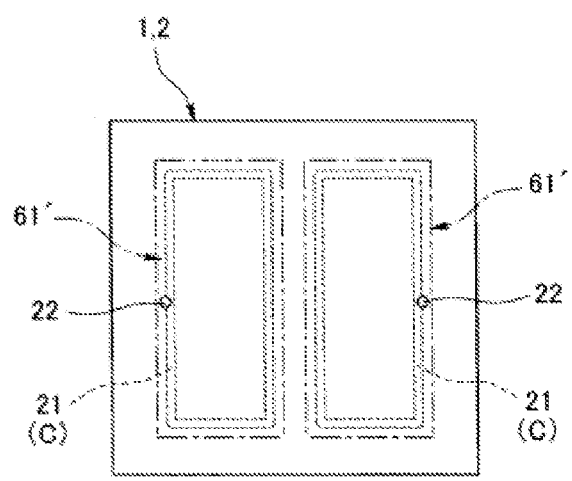
FIG. 2 is a plan view showing a relationship between a gate and a cavity in the preferable embodiment of the molding apparatus according to the present invention.

As shown in FIG. 2, the embodiment is structured such that two substrates 61' are set in the fixed metal mold 1. As a result, two groove-like concave portions 21 forming the molding cavities are formed in a lower surface of the metal mold 2, and the gates 22 are open at symmetric positions with each other heading for one positions of the respective groove-like concave portions 21 (the cavities C).

The cold metal mold member 3 is not heated, is thermally insulated at a temperature that the liquid rubber corresponding to the molding material is not crosslinked and cured, and is movable up and down by a drive unit (not shown). The cold runner 31 formed while passing through the cold metal mold member 3 is structured such that an upper end is formed as a sprue 31a and inlet valves 32 are provided respectively in downstream portions which extend while branching into a plurality of sections. The inlet valve 32 is structured such that a valve gate in a downstream end which can be operated to be opened and closed from an external portion can be connected to the gate 22 of the movable metal mold 2. Further, a heat insulating board 33 for preventing heat transmission from the movable metal mold 2 is provided in a lower surface portion of the cold metal mold member 3.

The injection device 4 has an injection nozzle 41 which has a plunger build-in, can come into close contact and collision (nozzle touch) with the sprue 31a in the upper surface of the cold metal mold member 3 in its leading end, and is structured such as to inject the liquid rubber to each of the cavities C through the cold runner 31, the inlet valve 32 and the gate 22 on the basis of a motion of the plunger in a close contact and collision state between the leading end of the injection nozzle 41 and the sprue 31a.

The turn table 5 can turn around a vertical center axis O, and plural sets of fixed metal molds 1 and movable metal molds 2 are installed on the turn table 5. The plural sets of fixed metal molds 1 and movable metal molds 2 are moved by the rotation of the turn table 5 between an injection stage S1 which is just below the injection device 4 and the cold metal mold member 3, and a mold opening stage S2 which is provided at a position rotationally moving at a predetermined angle around the center axis O from the injection stage S1 and for loading the substrate 61' to the concave portion 11 on the upper surface of the fixed metal mold 1 and taking out the product. Further, in the case that one certain set of fixed metal mold 1 and movable metal mold 2 are in the injection stage S1, the other set of fixed metal mold 1 and movable metal mold 2 are positioned in the mold opening stage S2.

Figure 3:
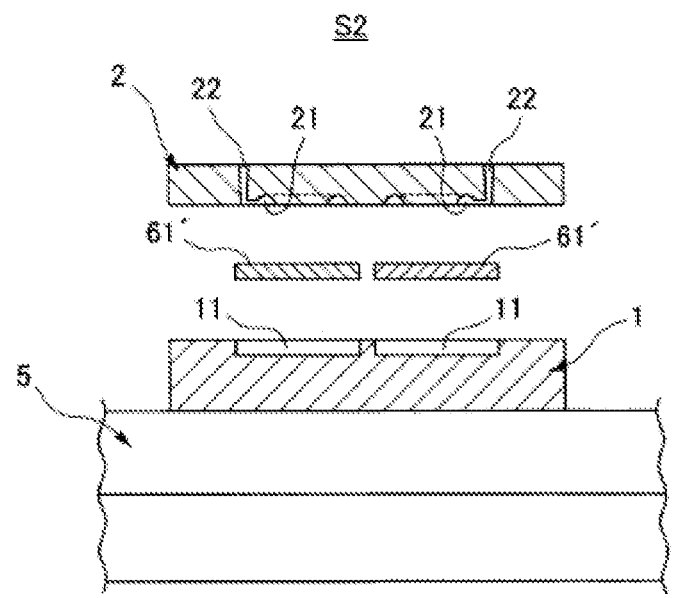
FIG. 3 is an explanatory view showing a step of setting a substrate, in the preferable embodiment of the molding apparatus according to the present invention.

Next, a description will be given of a molding cycle executed by the molding apparatus having the structure mentioned above. First of all, as shown in FIG. 3, the movable metal mold 2 are separated upward from the fixed metal mold 1 on the turn table 5 (mold open) in the mold opening stage S2, and the substrate 61' is set first of all to the concave portion 11 on the upper surface of the fixed metal mold 1 here by a loading device (not shown).

Figure 4:
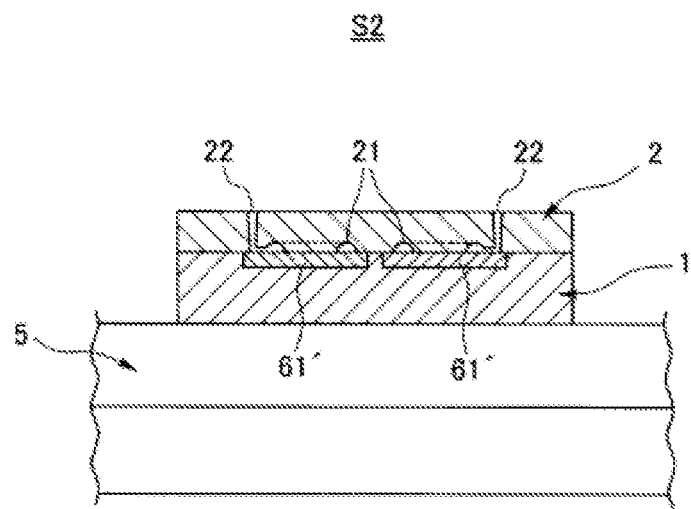
FIG. 4 is an explanatory view showing a state in which a movable metal mold is positioned and installed on a fixed metal mold, in the preferable embodiment of the molding apparatus according to the present invention.

Next, as shown in FIG. 4, the movable metal mold 2 comes down onto the fixed metal mold 1 in which the substrate 61' is loaded, by a mold clamping device (not shown), and is positioned so as to achieve a mold closing state. As a result, the cavity C for molding the seal portion 62 of the fuel battery cell gasket 6 shown in FIG. 9 is defined between the upper surface of the substrate 61' which is loaded in the fixed metal mold 1 and the groove-like concave portion 21 of the movable metal mold 2.

Figure 5:
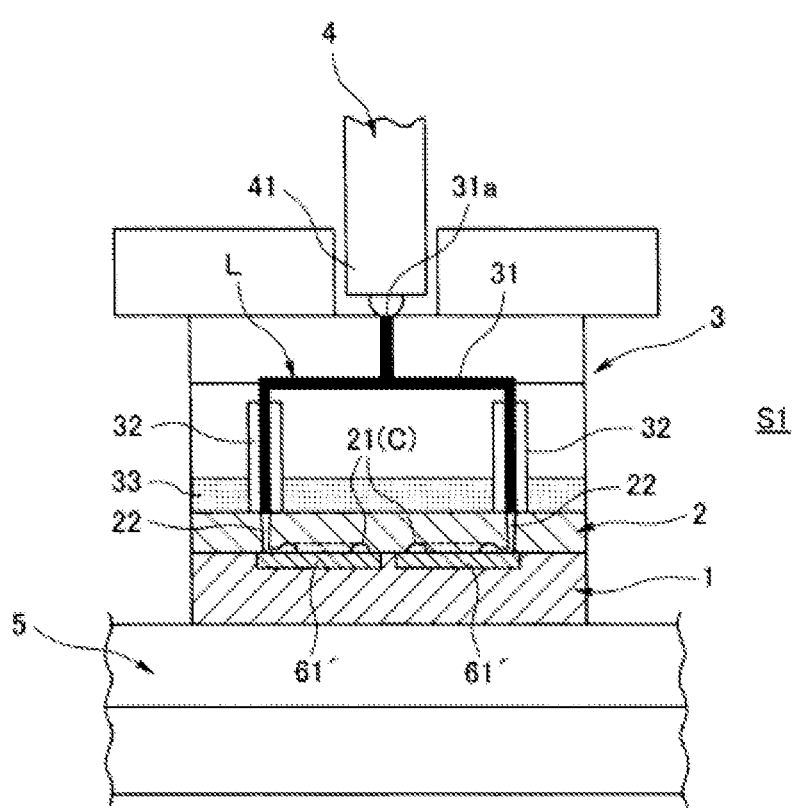
FIG. 5 is an explanatory view showing a mold clamping state, in the preferable embodiment of the molding apparatus according to the present embodiment.

Next, as shown in FIG. 5, the fixed metal mold 1 and the movable metal mold 2 are transferred to the injection stage S1 just below the injection device 4 and the cold metal mold member 3 on the basis of the rotation of the turn table 5, and the cold metal mold member 3 comes down here and is joined onto the movable metal mold 2. Further, the valve gate in the downstream end of the inlet valve 32 provided in the cold runner 31 is in a connection state to the gate 22 of the movable metal mold 2.

Next, the valve gate of the inlet valve 32 is opened, and the liquid rubber corresponding to the molding material is injected from the injection nozzle 41 on the basis of an injecting motion of the injection device 4 which is brought into close contact and collision with the sprue 31a on the upper surface of the cold metal mold member 3. Further, since the cold metal mold member 3 is thermally insulated at the temperature that the liquid rubber does not crosslink and cure, the liquid rubber injected from the injection nozzle 41 is fed to the cavity C from the cold runner 31 through the inlet valve 32 and the gate 22 without crosslinking and curing, as shown in FIG. 6.

It is preferable to employ a material which generates a self-adhesiveness in relation to the substrate 61' by crosslinking and curing for the liquid rubber corresponding to the molding material, however, in the case that a liquid rubber having no self-adhesiveness is employed, an adhesive agent is previously applied to the surface of the substrate 61'.

Figure 6:
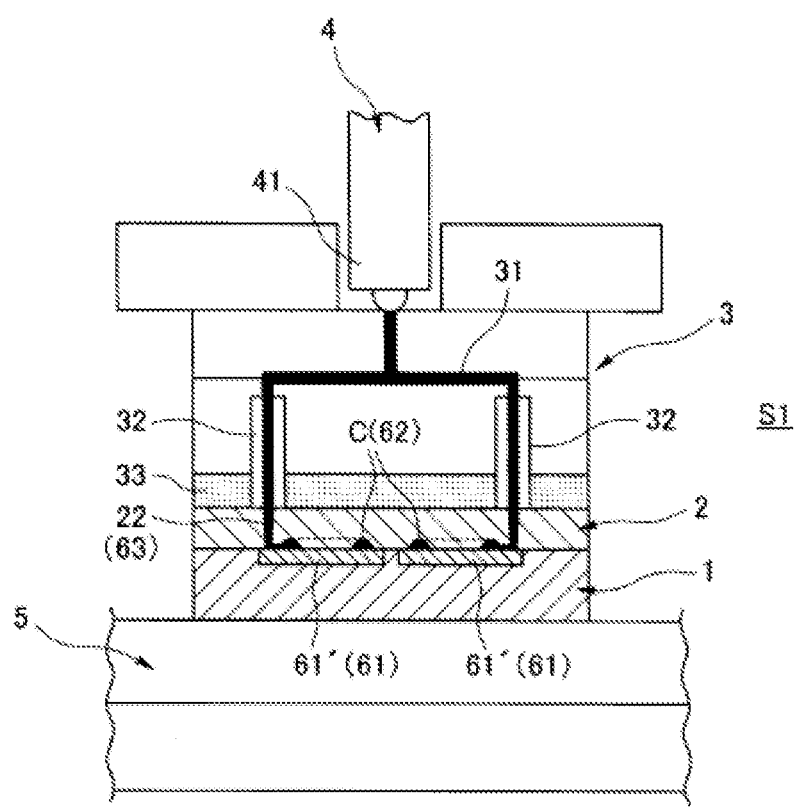
FIG. 6 is an explanatory view showing a state in which a liquid rubber is injected into a cavity, in the preferable embodiment of the molding apparatus according to the present invention.

Further, a portion L blacked out in FIG. 5 is an uncured liquid rubber which is left within the cold runner 31 and the inlet valve 32 in the preceding molding cycle, and the liquid rubber L is filled in the cavity C in advance of the liquid rubber injected from the injection nozzle 41, in a process shown in FIG. 6.

When the filling of the liquid rubber in the cavity C is finished, the valve gate in the downstream end of the inlet valve 32 is closed. As a result, the liquid rubber within the cavity C is kept at a predetermined pressure.

The liquid rubber within the cavity C is crosslinked and cured by the heat of the fixed metal mold 1 and the movable metal mold 2, is molded as the seal portion 62 having the shape corresponding to the cavity C, and is integrated (vulcanization bonded) with the upper surface of the substrate 61' (the separator 61) on the fixed metal mold 1. The liquid rubber within the gate 22 open to the cavity C is crosslinked and cured by the heat of the movable metal mold 2 and forms a burr 63 which is continuously provided in the seal portion 62. On the other hand, since the cold metal mold member 3 is thermally insulated at the temperature that the liquid rubber does not crosslink and cure, and the heat from the movable metal mold 2 is insulated by the heat insulating board 33, the liquid rubber left within the cold runner 31 does not crosslink and cure, and is filled in the cavity C at the next shot time.

Figure 7:
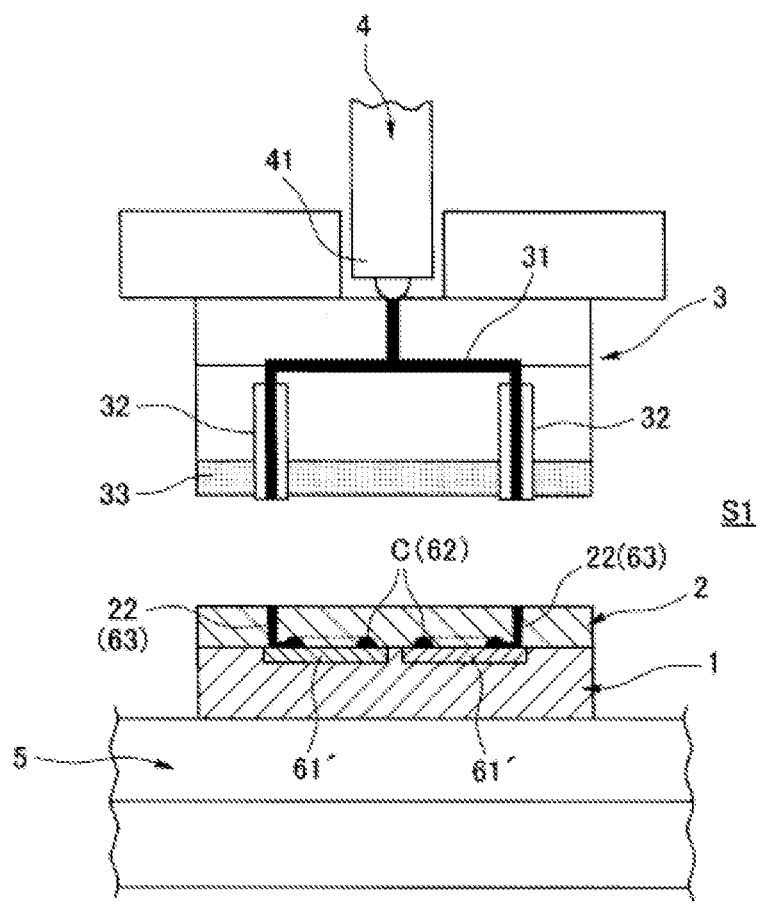
FIG. 7 is an explanatory view showing a state in which the movable metal mold and the fixed metal mold are separated from the cold runner, in the preferable embodiment of the molding apparatus according to the present invention.

When a necessary time for crosslinking and curing the liquid rubber within the cavity C has passed, the cold metal mold member 3 is moved up by the drive unit (not shown) as shown in FIG. 7, and is separated from the movable metal mold 2. Since the inlet valve 32 is closed at this time, the uncured liquid rubber left within the cold runner 31 neither leak out nor fall down.

Figure 8:
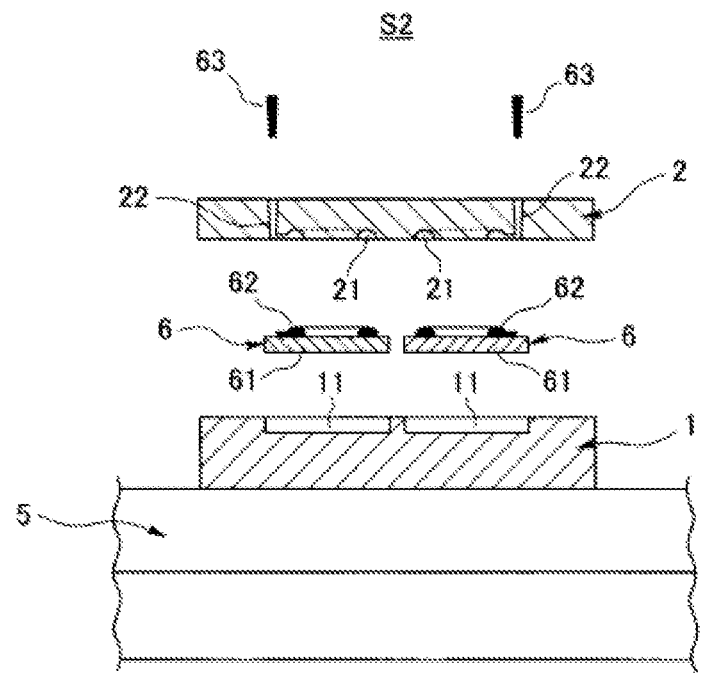
FIG. 8 is an explanatory view showing a step of mold releasing a product and removing burr, in the preferable embodiment of the molding apparatus according to the present invention.

Next, the fixed metal mold 1 and the movable metal mold 2 are transferred from the injection stage S1 just below the injection device 4 and the cold metal mold member 3 to the mold opening stage S2 shown in FIG. 1 on the basis of the rotation of the turn table 5, and the movable metal mold 2 is separated upward from the fixed metal mold 1 by the mold clamping device (not shown) so as to be mold opened as shown in FIG. 8. As a result, the burr 63 created within the gate 22 of the movable metal mold 2 is separated from the seal portion 62 of the fuel battery cell gasket 6 corresponding to the product which is held in the fixed metal mold 1 side.

Further, the fuel battery cell gasket 6 corresponding to the product is taken out of the fixed metal mold 1 by a product mold releasing device (not shown) as shown in FIG. 9, the product being structured such that the seal portion 62 made of the rubber-like elastic material is integrally molded in the separator 61, and the burr 63 is removed from the gate 22 of the movable metal mold 2 by a burr removing device (not shown).

Figure 10:
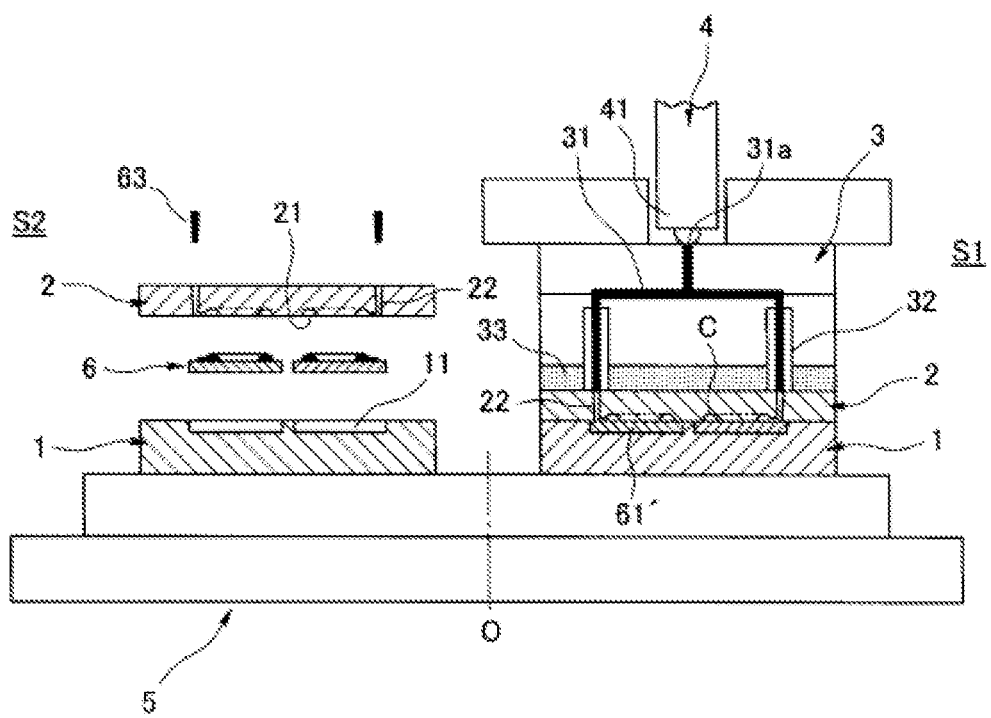
FIG. 10 is an explanatory view showing the injection step of the injection stage, and the step of mold releasing the product and removing the burr in the mold opening stage, in the preferable embodiment of the molding apparatus according to the present invention.

Since the product take-out step and the burr removing step are carried out in the mold opening stage S2 as mentioned above, a metal mold cleaning step in the injection stage S1 is not necessary. As shown in FIG. 10, the injecting step can be started in the injection stage S2 in parallel to the mold releasing of the product and the burr removal in the mold opening stage S2, and the setting work of the substrate 61' for the next molding. Therefore, it is possible to improve an efficiency of the molding cycle.

Further, only the burr generated within the gate 22 of the movable metal mold 2 is removed after the molding, and the liquid rubber left within the cold runner 31 is not cured, and is filled in the cavity C at the next shot time. As a result, waste of the molding material can be minimized, thereby contributing to cost reduction.

What is claimed is:

1. A molding apparatus comprising:
    a plurality of mold sets including at least a first mold set and a second mold set, each of the first and second mold sets including a fixed metal mold and a movable metal mold that are each heated to a necessary temperature for curing a molding material and are coupled together by mold clamping so as to define a cavity;
    a non-heated cold runner which supplies the molding material from an injection device into the cavity via a gate provided in the movable metal mold;
    an injection station in which the injection device and the cold runner exist; and
    a mold opening station which is in the vicinity of the injection station and opens the fixed metal mold and the movable metal mold,
    wherein the first and second mold sets are movable between the injection station and the mold opening station such that, when the first mold set is in the injection station, the non-heated cold runner is moved downward to communicate with the movable metal mold of the first mold set to provide the molding material into the gate and into the cavity of the first mold set, while the fixed metal mold and the movable metal mold of the second mold set are positioned in the mold opening station, wherein a product molded within the cavity and a burr molded within the movable metal mold in the injection stage are separated by mold opening in the mold opening station.

2. The molding apparatus according to claim 1, wherein the cold runner is provided with an inlet valve which can operate so as to open and close from an external portion.

* * * * *